United States Patent
Nwosu et al.

(10) Patent No.: US 12,351,708 B2
(45) Date of Patent: Jul. 8, 2025

(54) POLYAMIDE/POLYOLEFIN BLENDS AND CORRESPONDING MOBILE ELECTRONIC DEVICE COMPONENTS

(71) Applicant: SOLVAY SPECIALTY POLYMERS USA, LLC, Alpharetta, GA (US)

(72) Inventors: Chinomso Nwosu, Alpharetta, GA (US); Vijay Gopalakrishnan, Dunwoody, GA (US); Raleigh L. Davis, Suwanee, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 826 days.

(21) Appl. No.: 17/608,484

(22) PCT Filed: May 14, 2020

(86) PCT No.: PCT/EP2020/063492
§ 371 (c)(1),
(2) Date: Nov. 3, 2021

(87) PCT Pub. No.: WO2020/244899
PCT Pub. Date: Dec. 10, 2020

(65) Prior Publication Data
US 2022/0220293 A1 Jul. 14, 2022

Related U.S. Application Data

(60) Provisional application No. 62/857,470, filed on Jun. 5, 2019.

(30) Foreign Application Priority Data

Sep. 23, 2019 (EP) ..................... 19198882

(51) Int. Cl.
| | |
|---|---|
| *C08L 23/26* | (2025.01) |
| *C08K 7/14* | (2006.01) |
| *C08L 51/06* | (2006.01) |
| *C08L 77/02* | (2006.01) |
| *C08L 77/06* | (2006.01) |

(52) U.S. Cl.
CPC ................ *C08L 23/26* (2013.01); *C08K 7/14* (2013.01); *C08L 51/06* (2013.01); *C08L 77/02* (2013.01); *C08L 77/06* (2013.01)

(58) Field of Classification Search
CPC .......... C08L 23/26; C08L 51/06; C08L 77/06; C08L 77/02; C08K 7/14
See application file for complete search history.

(56) References Cited

U.S. PATENT DOCUMENTS

| | | | |
|---|---|---|---|
| 5,154,979 A | 10/1992 | Kerschbaumer et al. | |
| 5,312,867 A | 5/1994 | Mitsuno et al. | |
| 6,235,837 B1 | 5/2001 | Basset et al. | |
| 2008/0214699 A1 | 9/2008 | Halahmi et al. | |
| 2013/0206470 A1* | 8/2013 | Davis | H01R 13/72 439/502 |
| 2017/0022363 A1 | 1/2017 | Sabard et al. | |
| 2017/0321019 A1 | 11/2017 | Fujita et al. | |
| 2019/0224951 A1 | 7/2019 | Zennyoji et al. | |
| 2020/0079919 A1 | 3/2020 | Tsuchigane et al. | |

FOREIGN PATENT DOCUMENTS

| | | |
|---|---|---|
| CN | 1106430 A | 8/1995 |
| CN | 105482383 A | 4/2016 |
| CN | 107151384 A | 9/2017 |
| CN | 108912578 A | 11/2018 |
| EP | 1086930 A1 | 3/2001 |
| JP | H03205429 A | 9/1991 |
| JP | 2017052974 A | 3/2017 |
| WO | WO 2016076411 A1 | 5/2016 |
| WO | WO 2018042995 A1 | 3/2018 |
| WO | WO 2019063608 A1 | 4/2019 |
| WO | WO 2019159861 A1 | 8/2019 |

OTHER PUBLICATIONS

Machine English translation of CN 107151384, Ding et al., Dec. 9, 2017.*
Murphy J., in "Additives for Plastics Handbook", 2nd Edition, 2001, Chapter 5.2.3., p. 43-48—Elsevier Advanced Technology.
Hausrath R.L. et al., in "Fiberglass and Glass Technology", 2010, XIV, Chapter 5, p. 197-225—Wallenberger F.T. and Bingham P.A. (Editors).

* cited by examiner

*Primary Examiner* — Patrick D Niland

(57) ABSTRACT

Described herein are polymer compositions including an a functionalized polyolefin, an aliphatic polyamide, and a glass fiber, where the weight ratio of the functionalized polyolefin to the total weight of the aliphatic polyamide and the functionalized polyolefin in the polymer composition ("polyolefin weight ratio") is from 55% to 95%. It was surprisingly discovered that the polymer compositions had excellent dielectric performance and improved mechanical performance, relative to corresponding polymer compositions. Due to the excellent dielectric performance and increased mechanical performance, the polymer composition can be desirably incorporated into mobile electronic device applications.

21 Claims, No Drawings

POLYAMIDE/POLYOLEFIN BLENDS AND CORRESPONDING MOBILE ELECTRONIC DEVICE COMPONENTS

CROSS REFERENCE TO RELATED APPLICATIONS

This application is a U.S. national stage entry under 35 U.S.C. § 371 of International Application No. PCT/EP2020/063492 filed May 14, 2020, which claims priority to U.S. provisional patent application No. 62/857,470, filed on 5 Jun. 2019, and European patent application No. 19198882.3, filed on 23 Sep. 2019, the whole content of each of these applications being incorporated herein by reference for all purposes.

FIELD OF THE INVENTION

The invention relates to polymer compositions including a functionalized polyolefin, an aliphatic polyamide, and a glass fiber, the polymer composition having excellent dielectric performance and mechanical performance. The invention also relates to mobile electronic device components including the polymer composition.

BACKGROUND OF THE INVENTION

Due to their reduced weight and high mechanical performance, polyamide compositions are widely used in mobile electronic device components. In particular, polyamide polymer compositions including glass fibers are especially suitable for mobile electronic device applications. Because such compositions can have appropriate mechanical strength, reduced weight and greater design options, they are attractive as a metal replacement in mobile electronic device components.

SUMMARY OF INVENTION

In a first aspect, the invention relates to a polymer composition comprising a functionalized polyolefin, an aliphatic polyamide, a glass fiber, and a functionalized polyolefin weight ratio of from 55% to 95%, wherein the functionalized polyolefin weight ratio is given by the formula:

$$100 \times \frac{W_{PO}}{W_{PO} + W_{PA}},$$

and $W_{PA}$ and $W_{PO}$ are, respectively, the weight of the aliphatic polyamide and the functionalized polyolefin in the polymer composition.

In some embodiments, the polymer composition has a tensile strength of at least 83 MPa. Additionally or alternatively, in some embodiments, the polymer composition has a tensile strain of at least 2.8%. Additionally or alternatively, in some embodiments, the polymer composition has a tensile modulus of at least 7.8 GPa. In some embodiments, the polymer composition has a $D_k$ at 1 MHz of no more than 3.1 and a $D_f$ at 1 MHz of no more 0.007.

In another aspect, the invention relates to a mobile electronic device component comprising the polymer composition. In some embodiments, the mobile electronic device is a mobile electronic device housing.

DETAILED DESCRIPTION OF THE INVENTION

Described herein are polymer compositions including an a functionalized polyolefin, an aliphatic polyamide, and a glass fiber, where the weight ratio of the functionalized polyolefin to the total weight of the aliphatic polyamide and the functionalized polyolefin in the polymer composition ("polyolefin weight ratio") is from 55% to 95%. It was surprisingly discovered that the polymer compositions had excellent dielectric performance and improved mechanical performance, relative to corresponding polymer compositions. As used herein, a polymer composition and a corresponding polymer composition are identical, except for the fact that the polyolefin weight ratio in the corresponding polymer composition is outside the range of from 55% to 95%. More particularly, the polyolefin weight ratio of a corresponding polymer composition is less than 55%, preferably less than or equal to 50%, or greater than 95%, preferably greater than or equal to 99%. Due to the excellent dielectric performance and increased mechanical performance, the polymer composition can be desirably incorporated into mobile electronic device applications.

In the present application, any description, even though described in relation to a specific embodiment, is applicable to and interchangeable with other embodiments of the present disclosure. Furthermore, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list.

Unless specifically limited otherwise, the term "alkyl", as well as derivative terms such as "alkoxy", "acyl" and "alkylthio", as used herein, include within their scope straight chain, branched chain and cyclic moieties. Examples of alkyl groups are methyl, ethyl, 1-methylethyl, propyl, 1,1-dimethylethyl, and cyclo-propyl. Unless specifically stated otherwise, each alkyl and aryl group may be unsubstituted or substituted with one or more substituents selected from but not limited to halogen, hydroxy, sulfo, $C_1$-$C_6$ alkoxy, $C_1$-$C_6$ alkylthio, $C_1$-$C_6$ acyl, formyl, cyano, $C_6$-$C_{15}$ aryloxy or $C_6$-$C_{15}$ aryl, provided that the substituents are sterically compatible and the rules of chemical bonding and strain energy are satisfied. The term "halogen" or "halo" includes fluorine, chlorine, bromine and iodine, with fluorine being preferred.

The term "aryl" refers to a phenyl, indanyl or naphthyl group. The aryl group may comprise one or more alkyl groups, and are called sometimes in this case "alkylaryl"; for example may be composed of an aromatic group and two $C_1$-$C_6$ groups (e.g. methyl or ethyl).

The aryl group may also comprise one or more heteroatoms, e.g. N, O or S, and are called sometimes in this case "heteroaryl" group; these heteroaromatic rings may be fused to other aromatic systems. Such heteroaromatic rings include, but are not limited to furanyl, thienyl, pyrrolyl, pyrazolyl, imidazolyl, triazolyl, isoxazolyl, oxazolyl, thiazolyl, isothiazolyl, pyridyl, pyridazyl, pyrimidyl, pyrazinyl and triazinyl ring structures. The aryl or heteroaryl substituents may be unsubstituted or substituted with one or more substituents selected from but not limited to halogen, hydroxy, $C_1$-$C_6$ alkoxy, sulfo, $C_1$-$C_6$ alkylthio, $C_1$-$C_6$ acyl, formyl, cyano, $C_6$-$C_{15}$ aryloxy or $C_6$-$C_{15}$ aryl, provided that the substituents are sterically compatible and the rules of chemical bonding and strain energy are satisfied.

As noted above, the polymer compositions surprisingly had excellent dielectric performance and improved mechanical performance relative to corresponding polymer compositions. The polyolefin weight ratio is determined according to the following formula:

$$100 \times \frac{W_{PO}}{W_{PO} + W_{PA}},$$

where $W_{PA}$ and $W_{PO}$ and are, respectively, the weight of the aliphatic polyamide and the functionalized polyolefin in the polymer composition. In some embodiments, the polyolefin weight ratio is from 60% to 95%, from 65% to 95%, from 70% to 95%, from 55% to 92%, from 60% to 92%, from 65% to 92%, or from 70% to 92%. Of course, in some embodiments, the polymer composition may include a plurality of distinct polyolefins or distinct aliphatic polyamides, both according to the description below. In some such embodiments, $W_{PO}$ and $W_{PA}$ are, respectively, the total weight of the plurality of polyolefins and total weight of the plurality of aliphatic polyamides in the polymer composition.

With respect to dielectric performance, the dielectric constant ("$D_k$") and dissipation factor ("$D_f$") of a polymer composition is significant in determining the suitability for the material in application settings where radio communication is present. For example, in mobile electronic devices, the dielectric properties of the material forming the various components and housing can significantly degrade wireless radio signals (e.g. 1 MHz, 1 GHz, 2.4 GHz and 5.0 GHz frequencies) transmitted and received by the mobile electronic device through one or more antennas. The dielectric constant of a material represents, in part, the ability of the material to interact with the electromagnetic radiation and, correspondingly, disrupt electromagnetic signals (e.g. radio signals) travelling through the material. Accordingly, the lower the dielectric constant of a material at a given frequency, the less the material disrupts the electromagnetic signal at that frequency. Similarly, the dissipation factor is proportional to the dielectric loss in a material and, the lower the dissipation factor, the lower the dielectric loss to the material.

The polymer compositions described herein have excellent dielectric performance (relatively low $D_k$ and $D_f$). In some embodiments, the polymer composition has a $D_k$ at 1 MHz of no more than 3.2, no more than 3.1, no more than 3.0, no more than 2.9, no more than 2.8, or no more than 2.7. Additionally or alternatively, in some embodiments, the polymer composition has a $D_k$ at 1 MHz of no less than 2.6. In some embodiments, the polymer composition has a $D_k$ at 1 MHz from 2.6 to 3.1, from 2.6 to 3.0, from 2.6 to 2.9, from 2.6 to 2.8, from 2.6 to 2.7. In some embodiments, the polymer composition has a $D_f$ at 1 MHz of no more than 0.009, no more than 0.008, no more than 0.007, no more than 0.006, or no more than 0.005. Additionally or alternatively, in some embodiments the polymer composition has a $D_f$ at 1 MHz of at least 0.0025 or at least 0.003. In some embodiments, the polymer composition has a $D_f$ at 1 MHz of from 0.0025 to 0.009, from 0.0025 to 0.008, from 0.0025 to 0.007, from 0.0025 to 0.006, from 0.0025 to 0.005, from 0.003 to 0.009, from 0.003 to 0.008, from 0.003 to 0.007, from 0.003 to 0.006, from 0.003 to 0.005. $D_f$ and $D_k$ at 1 MHz can be measured according to ASTM D150 at 1.0 MHz. In some embodiments, the polymer composition can have a $D_f$ and $D_k$ in the ranges described above at a frequency of 2.4 GHz. $D_f$ and $D_k$ at 2.4 GHz can be measured according to ASTM D2520.

Additionally, as mentioned above, the polymer compositions described herein have surprisingly improved mechanical performance (e.g. tensile strength, tensile strain, tensile modulus, and impact strength (notched and un-notched)). More specifically, it was surprisingly found that polymer compositions having a polyolefin weight ratio of from 55% to 95% had improved mechanical performance relative to corresponding polymer compositions having a polyolefin weight ratio above or below the polyolefin weight ratio of from 55% to 95%. In some embodiments, the polymer composition has a tensile strength of at least 80 megaPascals ("MPa"), at least 85 MPa, or at least 90 MPa. Additionally or alternatively, in some embodiments, the polymer composition has a tensile strength of no more than 100 MPa, no more than 95 MPa, or no more than 92 MPa. In some embodiments, the polymer composition has a tensile strength of from 80 MPa to 100 MPa, from 85 MPa to 100 MPa, from 90 MPa to 100 MPa or from 90 MPa to 95 MPa. In some embodiments, the polymer composition has a tensile strain of at least 2.8%. Additionally or alternatively, in some embodiments the polymer composition has a tensile strain of no more than 3.0%. In some embodiments, the polymer composition has a tensile strain of from 2.8% to 3.0%. In some embodiments, the polymer composition has a tensile modulus of at least 7.8 giga Pascals ("GPa"), at least 7.9 GPa, at least 8.0 GPa, or at least 8.1 GPa. Additionally or alternatively, in some embodiments, the polymer composition has a tensile modulus of no more than 9 GPa. In some embodiments, the polymer composition has a tensile modulus from 7.8 GPa to 9 GPa, from 7.9 GPa to 9 GPa, from 8.0 GPa to 9 GPa, or from 8.1 GPa to 9 GPa. In some embodiments, the polymer composition has a notched impact strength of at least 11.6 kilojoules per square meter ("kJ/m$^2$") or at least 11.7 kJ/m$^2$. Additionally or alternatively, in some embodiments, the polymer composition has a notched impact strength of no more than 13 kJ/m$^2$. In some embodiments, the polymer composition has a notched impact strength of from 11.6 kJ/m$^2$ to 13 kJ/m$^2$ or from 11.7 kJ/m$^2$ to 13 kJ/m$^2$. In some embodiments, the polymer composition has an un-notched impact strength of at least 49 kJ/m$^2$. Additionally or alternatively, in some embodiments, the polymer composition has an un-notched impact strength of no more than 55 kJ/m$^2$. In some embodiments, the polymer composition has an un-notched impact strength of from 49 kJ/m$^2$ to 55 kJ/m$^2$. Tensile strength, tensile strain, tensile modulus and notched impact strength and un-notched impact strength can be measured as described in the Examples.

The Functionalized Polyolefin Polymer

The polymer composition includes a functionalized polyolefin polymer. As used herein, a polyolefin polymer refers to any polymer having at least 50 mol % of a recurring unit $R_{PO}$. In some embodiments, the concentration of recurring units $R_{PO}$ is at least 60 mol %, at least 70 mol %, at least 80 mol %, at least 90 mol %, at least 95 mol %, at least 99 mol %, or at least 99.9 mol %. As used herein, mol % is relative to the total number of recurring units the polymer, unless explicitly stated otherwise. Recurring unit $R_{PO}$ is represented by the following:

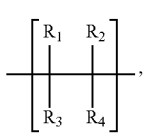
(1)

where $R_1$ to $R_4$ are independently selected from the group consisting of a hydrogen, and an alkyl group represented by the formula $-(CH_2)_n-CH_3$, where n is an integer from 0 to 5. For clarity, when n is zero, the alkyl group is a methyl group.

Functionalized polyolefin polymers are polyolefin polymers that include a reactive group that reacts with an amine group or a carboxylic acid group on the polyamide polymer, resulting in a covalent bond (e.g. an amide bond) between the polyolefin polymer and the polyamide polymer in the polymer composition. Put another way, the functionalized polyolefin includes at least some recurring units $R^*_{PO}$ according to formula (1) and distinct from recurring unit $R_{PO}$, in which at least one of $R_1$ to $R_4$ is replaced by a reactive group. Of course, in embodiments in which the polyolefin is fully functionalized, the functionalized polyolefin includes recurring units $R^*_{PO}$ and is free of recurring units $R_{PO}$. Desirable polyolefin polymers include, but are not limited to, polyethylene, polypropylene, polymethylpentene, polybutene-1, polyisobutylene, ethylene propylene rubber, and ethylene propylene diene monomer rubber; preferably the polyolefin is polypropylene. Desirable reactive groups include, but are not limited to, maleic anhydride, epoxide, isocyanate, and acrylic acid. Of course, in the polymer composition, the polyolefin is covalently bonded to the polyamide through residues formed from the reaction of at least some of the reactive groups on the polyolefin and the amine or carboxylic acid groups on the polyamide. For ease of reference, it will be understood that a reference to the reactive group on the functionalized polyolefin polymer in the polyamide polymer composition refers to any unreacted reactive groups on the functionalized polyolefin polymer as well as the residues formed from the reaction between the reactive group and an amine or carboxylic acid on the polyamide. For example, the person of ordinary skill in the art will understand that reference to maleic anhydride functionalized polyolefin in the polyamide polymer compositions refers to any unreacted maleic anhydride groups on the polyolefin polymer, as well as the residues formed from reaction of the maleic anhydride and the amine groups on the polyamide polymer.

In some embodiments the reactive group is represented by a formula selected from the following group of formulae:

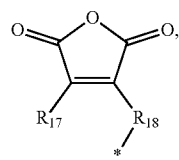
(2)

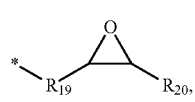
(3)

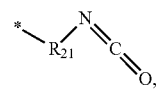
(4)

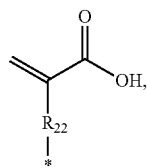
(5)

where $R_{17}$ and $R_{20}$ are selected from hydrogen and an alkyl group and $R_{18}$, $R_{19}$, $R_{21}$ and $R_{22}$ are selected from a bond and an alkyl group. Preferably, $R_{17}$ and $R_{20}$ are both hydrogen. Preferably, $R_{18}$, $R_{19}$, $R_{21}$ and $R_{22}$ are all a bond. For clarity, the "*" in formulae (2) to (5) indicate a bond to the carbon of the recurring unit $R^*_{PO}$.

The polyolefin can be functionalized at its chain ends or along the backbone (or both). In some embodiments in which the polyolefin is functionalized along the backbone, the functionalized polyolefin includes, in total, at least 50 mol % of a recurring unit $R_{PO1}$ and a recurring unit $R_{PO2}$ (defined below). In some embodiments, the total concentration of recurring units $R_{PO1}$ and $R_{PO2}$ in the functionalized polyolefin polymer is at least 60 mol %, at least 70 mol %, at least 80 mol %, at least 90 mol %, at least 95 mol %, at least 95 mol %, or at least 99 mol %. Within the ranges of the total concentration of $R_{PO1}$ and $R_{PO2}$ described above, in some embodiments, the concentration of recurring unit $R_{PO2}$ is at least 0.05 mol % to 10 mol %, from 0.05 mol % to 8 mol %, from 0.05 mol % to 6 mol %, from 0.05 mol % to 4 mol %, from 0.05 mol % to 2 mol %, from 0.05 mol % to 1.5 mol %, or from 0.1 mol % to 1.5 mol %.

Recurring units $R_{PO1}$ and $R_{PO2}$ are represented by the following formulae, respectively:

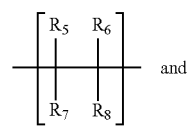
(6)

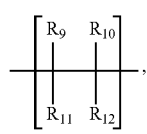
(7)

where $R_5$ to $R_8$ are independently selected from the group consisting of a hydrogen and an alkyl group represented by the formula $-(CH_2)_2-CH_3$, where m is an integer from 0 to 5; $R_9$ to $R_{12}$ are independently selected from the group consisting of a hydrogen, an alkyl group represented by the formula $-(CH_2)_{m'}-CH_3$, where m, is an integer from 0 to 5, and a reactive group that reacts with an amine group or a carboxylic acid group of the polyamide polymer; and wherein at least one of $R_9$ to $R_{12}$ is a reactive group. In some embodiments, the reactive group is represented by a formula selected from the group consisting of formulae (2) to (5). In some embodiments, $R_5$ to $R_7$ are all hydrogen and $R_8$ is a $-CH_3$. Additionally or alternatively, in some embodiments, $R_9$ and $R_{11}$ are both hydrogen, $R_{10}$ is a $-CH_3$, and $R_{12}$ is a reactive group as described above, preferably maleic anhydride. Excellent results were obtained maleic anhydride functionalized polypropylene.

In some of the above embodiments in which the functionalized polyolefin includes recurring units $R_{PO1}$ and $R_{PO2}$, the molar ratio of $R_{PO2}$ to ($R_{PO1}$+$R_{PO1}$) (number of moles of recurring unit $R_{PO1}$/number of moles of recurring unit $R_{PO1}$+$R_{PO2}$) is from 0.01 mol % to 6 mol %, from 0.01 mol % to 5.6 mol % or from 0.01 mol % to 5 mol %.

In some embodiments, the functionalized polyolefin polymer has a melt mass flow rate ("MFR") of at least 1 g/10 min., at least 5 g/10 min., at least 10 g/10 min. at least 15 g/10 min or at least 20 g/10 min. Additionally or alternatively, in some embodiments, the functionalized polyolefin polymer has a MFR of no more than 120 g/10 min, no more than 100 g/10 min., no more than 80 g/10 min., no more than 70 g/10 min. In some embodiments, the functionalized polyolefin polymer has a MFR of from 1 g/10 min., to 120 g/10 min. from 5 g/10 min. to 100 g/10 min, from 10 g/10 min. to 80 g/10 min. or from 15 g/10 min. to 70 g/10 min. MFR can be measured according to ASTM D1238 at a 190° C. and 1.2 kg.

In some embodiments, the functionalized polyolefin concentration in the polymer composition is at least 25 weight percent ("wt. %"), at least 30 wt. %, or at least 35 wt. %. Additionally or alternatively, in some embodiments the functionalized polyolefin concentration in the polymer composition is no more than 55 wt. %, no more than 52 wt. %, or no more than 50 wt. %. In some embodiments, the functionalized polyolefin concentration in the polymer composition is from 25 wt. % to 55 wt. %, from 30 wt. % to 55 wt. %, from 35 wt. % to 55 wt. %, 25 wt. % to 52 wt. %, from 30 wt. % to 52 wt. %, from 35 wt. % to 52 wt. %, from 25 wt. % to 50 wt. %, from 30 wt. % to 50 wt. %, or from 35 wt. % to 50 wt. %. As used herein, weight percent is relative to the total weight of the polymer composition, unless explicitly noted otherwise.

In some embodiments, the polymer composition includes a plurality of distinct functionalized polyolefins according to the above description. In some such embodiments, the total concentration of distinct functionalized polyolefins is within the ranges described above. The person of ordinary skill in the art will recognize that the selections of the functionalized polyolefin concentration and the aliphatic polyamide concentration (described below) are related by the polyolefin weight ratio. The selection of the functionalized polyolefin concentration and the aliphatic polyamide concentration is made such that the polyolefin weight ratio is within the selected range and such that the total concentration of functionalized polyolefins, aliphatic polyamides and optional additives within the polymer composition less than or equal to 100 wt. %.

The Aliphatic Polyamide Polymer

As used herein, an aliphatic polyamide polymer includes at least 50 mol % of a recurring unit $R_{P4}$, which has an amide bond (—NH—CO—) and is free of any aromatic groups. Put another way, both the diamine and diacid forming, through polycondensation, recurring $R_{P4}$ are free of any aromatic groups. In some embodiments, the aliphatic polyamide polymer has at least 60 mol %, at least 70 mol %, at least 80 mol %, at least 90 mol %, at least 95 mol %, at least 95 mol %, at least 99 mol %, or at least 99.9 mol % of recurring unit $R_{P4}$.

In some embodiments, recurring unit $R_{P4}$ is represented by the following formula:

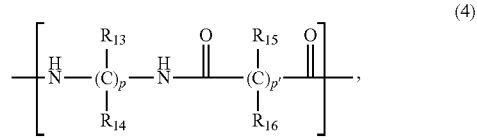

(4)

where $R_{13}$ to $R_{16}$, at each location, is independently selected from the group consisting of a hydrogen, an alkyl, an aryl, an alkali or alkaline earth metal sulfonate, an alkyl sulfonate, and a quaternary ammonium; p is an integer from 4 to 10; and p' is an integer from 7 to 12. In some embodiments, $R_{13}$ to $R_{16}$, at each location, is a hydrogen. Additionally or alternatively, in some embodiments, p is 5 or 6 and p' is 8 to 12. In some embodiments, the aliphatic polyamide polymer is selected from the group consisting of PA4,6; PA5,6; PA5,10; PA6,10; PA10,10; and PA10,12.

In some embodiments, the aliphatic polyamide polymer has an inherent viscosity of 0.7 to 1.4 deciliters/g ("dL/g"), as measured according to ASTM D5336.

In some embodiments, the concentration of the aliphatic polyamide in the polymer composition is at least 3 wt. %, at least 4 wt. % or at least 5 wt %. Additionally or alternatively, in some embodiments the concentration of the aliphatic polyamide in the polymer composition is no more than 45 wt. %, no more than 30 wt. % or no more than 25 wt. %. In some embodiments, the concentration of the aliphatic polyamide in the polymer composition is from 3 wt. % to 45 wt. %, from 4 wt. % to 45 wt. %, from 5 wt. % to 45 wt. %, from 3 wt. % to 30 wt. %, from 4 wt. % to 30 wt. %, from 5 wt. % to 30 wt. %, from 3 wt. % to 25 wt. %, from 4 wt. % to 25 wt. %, from 5 wt. % to 25 wt. % or from 5 wt. to 20 wt. %. In some embodiments, the polymer composition includes a plurality of distinct aliphatic polyamides according to the above description. In some such embodiments, the total concentration of distinct aliphatic polyamides is within the ranges described above.

The Glass Fiber

The polyamide polymer composition includes glass fiber. Glass fibers are silica-based glass compounds that contain several metal oxides which can be tailored to create different types of glass. The main oxide is silica in the form of silica sand; the other oxides such as calcium, sodium and aluminum are incorporated to reduce the melting temperature and impede crystallization. The glass fibers can be added as endless fibers or as chopped glass fibers. The glass fibers have generally an equivalent diameter of 5 to 20 preferably of 5 to 15 μm and more preferably of 5 to 10 μm. All glass fiber types, such as A, C, D, E, M, S, R, T glass fibers (as described in chapter 5.2.3, pages 43-48 of Additives for Plastics Handbook, 2nd ed, John Murphy), or any mixtures thereof or mixtures thereof may be used.

E, R, S and T glass fibers are well known in the art. They are notably described in Fiberglass and Glass Technology, Wallenberger, Frederick T.; Bingham, Paul A. (Eds.), 2010, XIV, chapter 5, pages 197-225. R, S and T glass fibers are composed essentially of oxides of silicon, aluminium and magnesium. In particular, those glass fibers comprise typically from 62-75 wt. % of $SiO_2$, from 16-28 wt. % of $Al_2O_3$ and from 5-14 wt. % of MgO. On the other hand, R, S and T glass fibers comprise less than 10 wt. % of CaO.

In some embodiments, the glass fiber is a high modulus glass fiber. High modulus glass fibers have an elastic modulus of at least 76, preferably at least 78, more preferably at least 80, and most preferably at least 82 GPa as measured according to ASTM D2343. Examples of high modulus glass fibers include, but are not limited to, S, R, and T glass fibers. A commercially available source of high modulus glass fibers is S-1 and S-2 glass fibers from Taishan and AGY, respectively.

In some embodiments, the glass fiber is a low $D_k$ glass fiber. Low $D_k$ glass fibers have a dielectric constant of from 4.0 to 5.5, from 4.0 to 5.4, from 4.0 to 5.3, from 4.0 to 5.2, from 4.0 to 5.1, or from 4.0 to 5.0, at a frequency of 1 MHz, 600 MHz, 1 GHz and 2.4 GHz. Low $D_k$ glass fibers can also have a low $D_f$ ("low $D_k/D_f$ glass fiber"). Such glass fibers have a $D_f$ of rom 0.0005 to 0.001, at a frequency of 1 MHz, 1 GHz, 600 MHz and 2.4 GHz. The $D_f$ and $D_k$ of the glass fibers can be measured according to ASTM D150 (1.0 MHz) and ASTM D2520 (600 MHz, 1.0 Ghz and 2.4 GHz). In some embodiments, the glass fiber is a high modulus and low $D_k$ glass fiber.

The morphology of the glass fiber is not particularly limited. As noted above, the glass fiber can have a circular cross-section ("round glass fiber") or a non-circular cross-section ("flat glass fiber"). Examples of suitable flat glass fibers include, but are not limited to, glass fibers having oval, elliptical and rectangular cross sections. In some embodiments in which the polymer composition includes a flat glass fiber, the flat glass fiber has a cross-sectional longest diameter of at least 15 μm, preferably at least 20 μm, more preferably at least 22 μm, still more preferably at least 25 μm. Additionally or alternatively, in some embodiments, the flat glass fiber has a cross-sectional longest diameter of at most 40 μm, preferably at most 35 μm, more preferably at most 32 μm, still more preferably at most 30 μm. In some embodiments, the flat glass fiber has a cross-sectional diameter was in the range of 15 to 35 μm, preferably of 20 to 30 μm and more preferably of 25 to 29 μm. In some embodiments, the flat glass fiber has a cross-sectional shortest diameter of at least 4 μm, preferably at least 5 μm, more preferably at least 6 μm, still more preferably at least 7 μm. Additionally or alternatively, in some embodiments, the flat glass fiber has a cross-sectional shortest diameter of at most 25 μm, preferably at most 20 μm, more preferably at most 17 μm, still more preferably at most 15 μm. In some embodiments, the flat glass fiber has a cross-sectional shortest diameter was in the range of 5 to 20 preferably of 5 to 15 μm and more preferably of 7 to 11 μm.

In some embodiments, the flat glass fiber has an aspect ratio of at least 2, preferably at least 2.2, more preferably at least 2.4, still more preferably at least 3. The aspect ratio is defined as a ratio of the longest diameter in the cross-section of the glass fiber to the shortest diameter in the same cross-section. Additionally or alternatively, in some embodiments, the flat glass fiber has an aspect ratio of at most 8, preferably at most 6, more preferably of at most 4. In some embodiments, the flat glass fiber has an aspect ratio of from 2 to 6, and preferably, from 2.2 to 4. In some embodiments, in which the glass fiber is a round glass fiber, the glass fiber has an aspect ratio of less than 2, preferably less than 1.5, more preferably less than 1.2, even more preferably less than 1.1, most preferably, less than 1.05. Of course, the person of ordinary skill in the art will understand that regardless of the morphology of the glass fiber (e.g. round or flat), the aspect ratio cannot, by definition, be less than 1.

In some embodiments, the glass fiber concentration in the polymer composition is at least 20 wt. %, at least 25 wt. %, or at least 30 wt. %. Additionally or alternatively, in some embodiments, the glass fiber concentration in the polymer composition is no more than 60 wt. %, no more than 55 wt. %, or no more than 50 wt. %. In some embodiments, the glass fiber concentration in the polymer composition is from 20 wt. % to 60 wt. %, from 25 wt. % to 60 wt. %, from 30 wt. % to 60 wt %, from 20 wt. % to 55 wt. %, from 25 wt. % to 55 wt. %, from 30 wt. % to 55 wt %, from 20 wt. % to 50 wt. %, from 25 wt. % to 50 wt. %, or from 30 wt. % to 50 wt. %.

Optional Additives

In some embodiments, polyamide polymer composition optionally includes an additive selected from the group consisting of ultra-violet ("UV") stabilizers, heat stabilizers, pigments, dyes, flame retardants, impact modifiers, lubricants and any combination of one or more thereof. In some embodiments in which the polymer composition includes optional additives, the total concentration of additives is no more than 15 wt. %, no more than 10 wt. %, no more than 5 wt. %, no more than 1 wt. %, no more 0.5 wt. %, no more than 0.4 wt. %, no more than 0.3 wt. %, no more than 0.2 wt. %, or no more than 0.1 wt. %.

Formation Methods

The polymer compositions can be made using methods well known in the art. For example, in one embodiment, the polymer composition can be made by melt-blending the polymers in the blend, the glass fibers, and any optional additives. Any suitable melt-blending method may be used for combining the components of the polymer composition. For example, in one embodiment, all of the polymer composition components (e.g. the polyamide, the polyolefin, the glass fiber and any optional additives) are fed into a melt mixer, such as single screw extruder or twin screw extruder, agitator, single screw or twin screw kneader, or Banbury mixer. The components can be added to the melt mixer all at once or gradually in batches. When the components are gradually added in batches, a part of the components is first added, and then is melt-mixed with the remaining components are subsequently added, until an adequately mixed composition is obtained. If a glass fiber presents a long physical shape (for example, a long glass fiber), drawing extrusion molding may be used to prepare a reinforced composition.

'Articles

Due at least in part to its surprisingly improved dielectric performance and mechanical performance, the polymer compositions described here can be desirably integrated into mobile electronic device components.

The term "mobile electronic device" is intended to denote an electronic device that is designed to be conveniently transported and used in various locations. Representative examples of mobile electronic devices may be selected from the group consisting of mobile electronic phones, personal digital assistants, laptop computers, tablet computers, radios, cameras and camera accessories, watches, calculators, music players, global positioning system receivers, portable games, hard drives and other electronic storage devices. Preferred mobile electronic devices include laptop computers, tablet computers, mobile electronic phones and watches.

Components of mobile electronic devices of interest herein include, but are not limited to, fitting parts, snap fit parts, mutually moveable parts, functional elements, operating elements, tracking elements, adjustment elements, carrier elements, frame elements, switches, connectors, cables, housings, and any other structural part other than housings as used in a mobile electronic devices, such as for example speaker parts. Said mobile electronic device components can be notably produced by injection molding, extrusion or other shaping technologies.

A "mobile electronic device housing" refers to one or more of the back cover, front cover, antenna housing, frame and/or backbone of a mobile electronic device. The housing may be a single article or comprise two or more components. A "backbone" refers to a structural component onto which other components of the device, such as electronics, microprocessors, screens, keyboards and keypads, antennas, battery sockets, and the like are mounted. The backbone may be an interior component that is not visible or only partially visible from the exterior of the mobile electronic device. The housing may provide protection for internal components of the device from impact and contamination and/or damage from environmental agents (such as liquids, dust, and the like). Housing components such as covers may also provide substantial or primary structural support for and protection against impact of certain components having exposure to the exterior of the device such as screens and/or antennas.

In a preferred embodiment, the mobile electronic device housing is selected from the group consisting of a mobile phone housing, an antenna housing, a tablet housing, a laptop computer housing, a tablet computer housing or a watch housing.

The article such as the mobile electronic device components can be made from the polymer composition using any suitable melt-processing method. For example, formation of the mobile electronic device component includes injection molding or extrusion molding the polymer composition. Injection molding is a preferred method.

EXAMPLES

The examples demonstrate the dielectric performance and mechanical performance of the polymer compositions. In the examples, the following components were used:

Polyamide ("PA"): PA6,10 (aliphatic polyamide polymer), commercially obtained under the trade name Radipol DC40 from Radici Functionalized Polyolefin ("PO"): maleic anhydride functionalized polypropylene copolymer, commercially obtained under the trade name Exxelor™ PO 1015, from ExxonMobil Glass Fiber ("GF"): Low $D_k/D_f$ glass fiber, commercially obtained from Chongqing Polycomp International Corp under the trade name CS(HL)301HP.

Additive Package: calcium stearate (lubricant) and heat stabilizer, Irganox® 1098 from BASF corporation.

Sample parameters are provided in Table 1. In Table 1, "PO weight ratio" refers to the ratio quantity:

$$100 \times \frac{W_{PO}}{W_{PO} + W_{PA}},$$

where $W_{PO}$ and $W_{PA}$ are, respectively, the weight of the PO and PA in the sample.

TABLE 1

| Sample No. | CE1 | E1 | E2 | CE2 |
|---|---|---|---|---|
| PA (wt. %) | 27.5 | 13.75 | 5 | 0 |
| PO (wt. %) | 27.2 | 40.95 | 49.7 | 54.7 |
| PO weight ratio | 50 | 75 | 91 | 100 |
| GF (wt. %) | 45 | 45 | 45 | 45 |
| Additive Package (wt. %) | 0.3 | 0.3 | 0.3 | 0.3 |

In the examples below, $D_f$ and $D_k$ were measured according to ASTM D150 at 1 MHz. Measurements of $D_k$ and $D_f$ at were taken on injection molded discs having dimensions of 50.8 mm diameter by 4.0 mm thickness. Tensile modulus, strength, and strain were measured on 5 injection molded ISO tensile bars according to ISO 527-2 using 1 mm/minute test speed to measure modulus and 5 mm/minute afterwards to measure tensile strength and strain. Impact strength was measured using notched-Izod impact testing, according to ISO 180 using 10 injection molded ISO bars with the following dimensions: length of 80 mm, thickness of 4 mm and width of 10 mm. Un-notched Izod and notched Izod impact testing was also performed on ISO bars of similar dimensions to the notched also in accordance to ISO 180.

Example 1: Performance of Polyamide/Polypropylene Blends

The present example demonstrates the dielectric and mechanical performance of polyamide/polyolefin blends.

The results of dielectric performance testing are displayed in Table 2.

TABLE 2

| Sample No. | CE1 | E1 | E2 | CE2 |
|---|---|---|---|---|
| Dielectric Performance | | | | |
| $D_k$ at 1 MHz | 3.01 | 2.78 | 2.69 | 2.61 |
| $D_f$ at 1 MHz | 0.0074 | 0.0048 | 0.0033 | 0.0020 |
| Mechanical Performance | | | | |
| Tensile Strength (MPa) | 82.2 | 91.5 | 90.1 | 81.3 |
| Tensile Strain (%) | 2.7 | 2.9 | 2.7 | 2.3 |
| Tensile Modulus (GPa) | 7.6 | 8.6 | 8.3 | 8.0 |
| Notched Impact Strength (kJ/m$^2$) | 11.5 | 11.9 | 12.6 | 11.4 |
| Un-Notched Impact Strength (kJ/m$^2$) | 48.8 | 49.6 | 52.2 | 44.1 |

Referring to Table 2, the samples having a PO weight ratio of greater than 50% and less than 100% had improved mechanical performance while maintaining excellent dielectric performance, relative to the samples having a PO weight ratio of 50% and 100%. CE1, E1, E2 and CE2 have, in order, increasing PO weight ratios. While the $D_k$ and $D_f$ decrease linearly with increasing PO weight ratio, the mechanical properties unexpectedly exhibit a non-linear behavior, with improved mechanical performance generally observed for the samples having a PO weight ratio of 75% and 91%. For example, tensile strength, tensile strain and tensile modulus all increase when going from a PO weight ratio of 50% to 75%. As the PO weight ratio is further increased to 100%, tensile strength, strain and modulus then decreased and, in the case of tensile strength and strain, decreased to a value below that observed for the sample having a PO weight ratio of 50% (CE1). Similar behavior is seen for the notched and un-notched impact strength however, for such properties, the local maximum is seen at a PO weight ratio of 91% (E2) and, at 100%, the values decrease below those obtained at PO weight ratio of 50%.

The embodiments above are intended to be illustrative and not limiting. Additional embodiments are within the inventive concepts. In addition, although the present invention is described with reference to particular embodiments, those skilled in the art will recognized that changes can be made in form and detail without departing from the spirit and scope of the invention. Any incorporation by reference of documents above is limited such that no subject matter is incorporated that is contrary to the explicit disclosure herein.

The invention claimed is:

1. A polymer composition comprising:
a functionalized polyolefin, an aliphatic polyamide,
a glass fiber, and
a functionalized polyolefin weight ratio of from 55% to 95%,
wherein the polymer composition has a $D_k$ at 1 MHz of no more than 3.2 and a $D_f$ at 1 MHz of no more 0.007,
wherein
the functionalized polyolefin weight ratio is given by the formula: $100 \times W_{PO}/W_{PO}+W_{PA}$, and
$W_{PA}$ and $W_{PO}$ are, respectively, the weight of the aliphatic polyamide and the functionalized polyolefin in the polymer composition and
wherein
the functionalized polyolefin comprises recurring units $R_{PO1}$ and $R_{PO2}$ that are represented by the following formulae, respectively:

$$100 \times \frac{W_{PO}}{W_{PO} + W_{PA}},$$

wherein $R_5$ to $R_8$ are independently selected from the group consisting of a hydrogen and an alkyl group represented by the formula $-(CH_2)_m-CH_3$, where m is an integer from 0 to 5; $R_9$ to $R_{12}$ are independently selected from the group consisting of a hydrogen, an alkyl group represented by the formula $-(CH_2)_{m'}-CH_3$, where $m_1$ is an integer from 0 to 5, and a reactive group that reacts with an amine group or a carboxylic acid group of the polyamide polymer; and wherein at least one of $R_9$ to $R_{12}$ is a reactive group, and
the functionalized polyolefin comprises from 0.05 mol % to 1.5 mol % of recurring unit $R_{PO2}$.

2. The polymer composition of claim 1, wherein the functionalized polyolefin polymer is selected from the group consisting of a functionalized polyethylene, a functionalized polypropylene, a functionalized polymethylpentene, a functionalized polybutene-1, a functionalized polyisobutylene, a functionalized ethylene propylene rubber, and a functionalized ethylene propylene diene monomer rubber.

3. The polymer composition of claim 1, wherein the functionalized polyolefin polymer is functionalized with a reactive group selected from the group consisting of a maleic anhydride, epoxide, isocyanate, and acrylic acid.

4. The polymer composition of claim 1, wherein the aliphatic polyamide comprises a recurring unit $R_{PA}$ represented by the following formula:

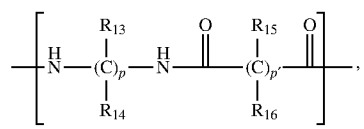

wherein
$R_{13}$ to $R_{16}$, at each location, is independently selected from the group consisting of a hydrogen, an alkyl, an aryl, an alkali or alkaline earth metal sulfonate, an alkyl sulfonate, and a quaternary ammonium;
p is an integer from 4 to 10; and
p' is an integer from 7 to 12.

5. The polymer composition of claim 1, wherein the polyamide is selected from the group consisting of PA4,6; PA5,6; PA5,10; PA6,10; PA10,10; and PA10,12.

6. The polymer composition of claim 1, wherein the glass fiber has a dielectric constant of 4.0 to 5.5 at a frequency of 1 MHz.

7. The polymer composition of claim 1, wherein the glass fiber concentration is from 20 wt. % to 60 wt. %.

8. The polymer composition of claim 1, wherein the functionalized polyolefin concentration is from 25 wt. % to 55 wt. %.

9. The polymer composition of claim 1, wherein the aliphatic polyamide concentration is from 3 wt. % to 30 wt. %.

10. The polymer composition of claim 1, wherein the polymer composition has a tensile strength of at least 83 MPa.

11. The polymer composition of claim 1, wherein the polymer composition has a tensile strain of at least 2.8%.

12. The polymer composition of claim 1, wherein the polymer composition has a tensile modulus of at least 7.8 GPa.

13. The polymer composition of claim 1, wherein the polymer composition has a $D_k$ at 1 MHz of no more than 3.0 and a $D_f$ at 1 MHz of no more 0.006.

14. The polymer composition of claim 1, wherein the polyolefin weight ratio is from 70 wt. % to 92 wt. %.

15. A mobile electronic device component comprising the polymer composition of claim 1.

16. The mobile electronic device component of claim 15, being a mobile electronic device housing.

17. A polymer composition comprising:
a functionalized polyolefin,
an aliphatic polyamide,
a glass fiber, and
a functionalized polyolefin weight ratio of from 55% to 95%,
wherein the polymer composition has at least one following tensile property:
a tensile strength of at least 83 MPa,
a tensile strain of at least 2.8%,
a tensile modulus of at least 7.8 GPa;
wherein
the functionalized polyolefin weight ratio is given by the formula:

$$100 \times \frac{W_{PO}}{W_{PO} + W_{PA}},$$

and
$W_{PA}$ and $W_{PO}$ are, respectively, the weight of the aliphatic polyamide and the functionalized polyolefin in the polymer composition; and
wherein
the functionalized polyolefin comprises recurring units $R_{PO1}$ and $R_{PO2}$ that are represented by the following formulae, respectively:

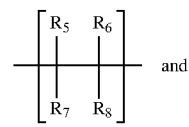

(6)

-continued

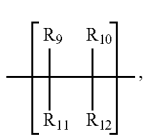
(7)

wherein $R_5$ to $R_8$ are independently selected from the group consisting of a hydrogen and an alkyl group represented by the formula $-(CH_2)_m-CH_3$, where m is an integer from 0 to 5; $R_9$ to $R_{12}$ are independently selected from the group consisting of a hydrogen, an alkyl group represented by the formula $-(CH_2)_m-CH_3$, where m, is an integer from 0 to 5, and a reactive group that reacts with an amine group or a carboxylic acid group of the polyamide polymer; and wherein at least one of $R_9$ to $R_{12}$ is a reactive group, and the functionalized polyolefin comprises from 0.05 mol % to 1.5 mol % of recurring unit $R_{PO2}$.

18. The polymer composition of claim 17, wherein the glass fiber has a dielectric constant of 4.0 to 5.5 at a frequency of 1 MHZ.

19. The polymer composition of claim 17, wherein the aliphatic polyamide concentration is from 3 wt. % to 30 wt. %; the functionalized polyolefin concentration is from 30 wt. % to 55 wt. %, and the glass fiber concentration is from 30 wt. % to 55 wt. %.

20. A mobile electronic device component comprising the polymer composition of claim 17.

21. The mobile electronic device component of claim 20, being a mobile electronic device housing.

* * * * *